United States Patent [19]

Mizerak et al.

[11] Patent Number: 4,528,198
[45] Date of Patent: Jul. 9, 1985

[54] PREPARATION OF LOW CALORIE BEER WITH MALT EXTRACT FREE OF YEAST LETHAL FACTORS

[75] Inventors: Robert J. Mizerak, Waukesha; Geoffrey H. Bertkau, Brookfield; William F. Line, Glendale; Etzer Chicoye, Wauwatosa, all of Wis.

[73] Assignee: Miller Brewing Company, Milwaukee, Wis.

[21] Appl. No.: 536,950

[22] Filed: Sep. 27, 1983

[51] Int. Cl.³ .......................... C12C 11/04; C12C 3/00
[52] U.S. Cl. ...................................... 426/16; 426/600
[58] Field of Search .................................. 426/16, 600

[56] References Cited

U.S. PATENT DOCUMENTS

| | | | |
|---|---|---|---|
| 3,379,534 | 4/1968 | Gablinger | 426/16 |
| 4,251,630 | 2/1981 | Pratt et al. | 426/16 |
| 4,272,552 | 6/1981 | Zastrow | 426/13 |
| 4,318,927 | 3/1982 | Marshall | 426/16 |

Primary Examiner—Sam Rosen
Attorney, Agent, or Firm—Quarles & Brady

[57] ABSTRACT

An aqueous extract containing $\alpha$-1,6 and $\alpha$-1,4 carbohydrases obtained from diastatic malt is treated with an adsorbent to remove yeast lethal factors and can be used to produce a superattenuated low calorie beer. The enzyme-containing extract preferably is introduced into a pitched aerated wort during fermentation. Crude aqueous extracts of diastatic malt cannot be used because they contain factors lethal to yeast which adversely affects the yeast viability throughout the fermentation.

8 Claims, 6 Drawing Figures

FIG. IA
FIG. IB
○ BEER I
● BEER II
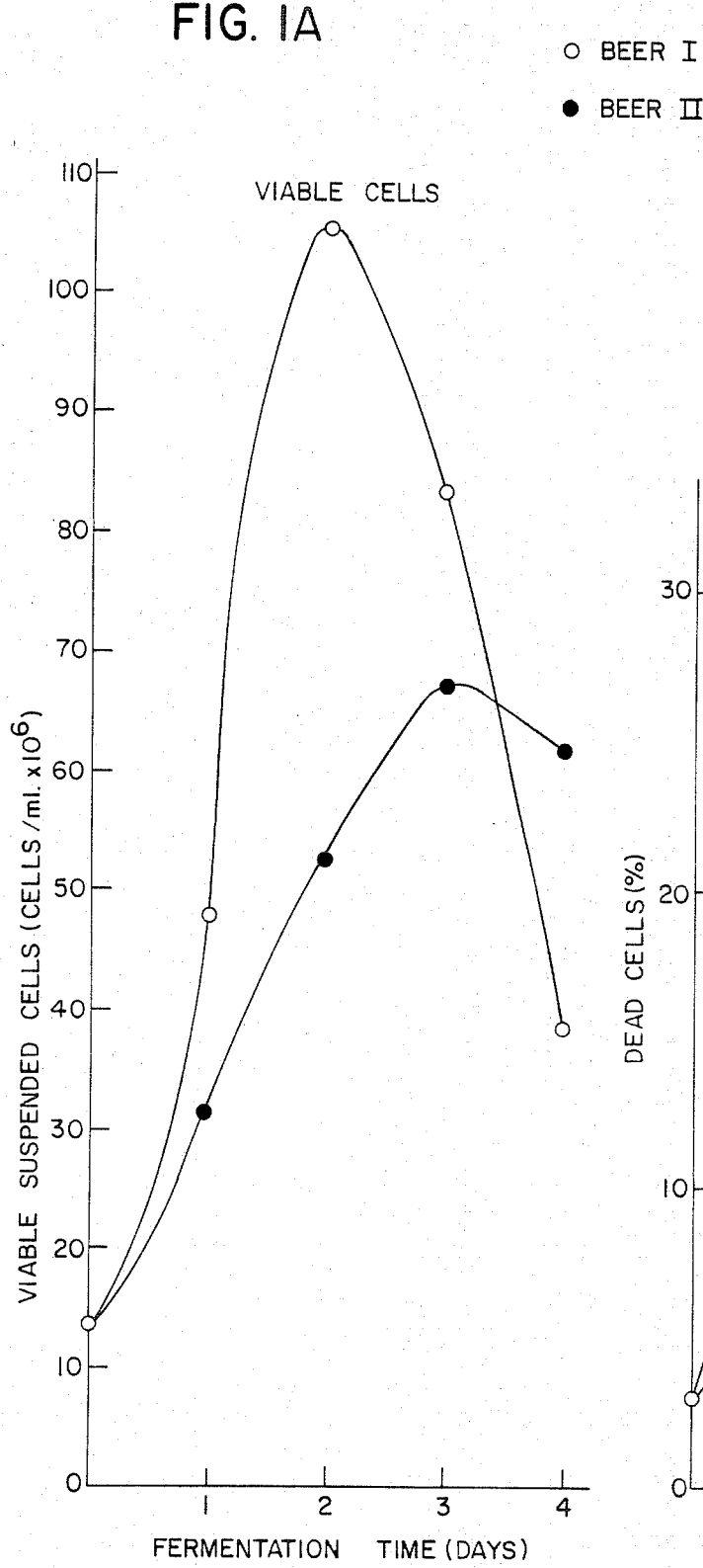
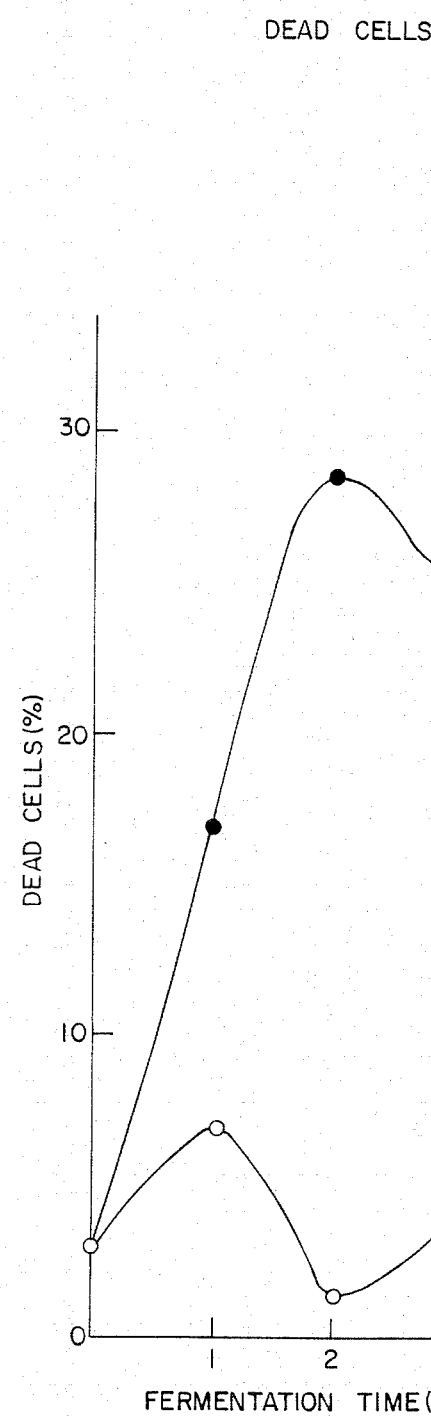

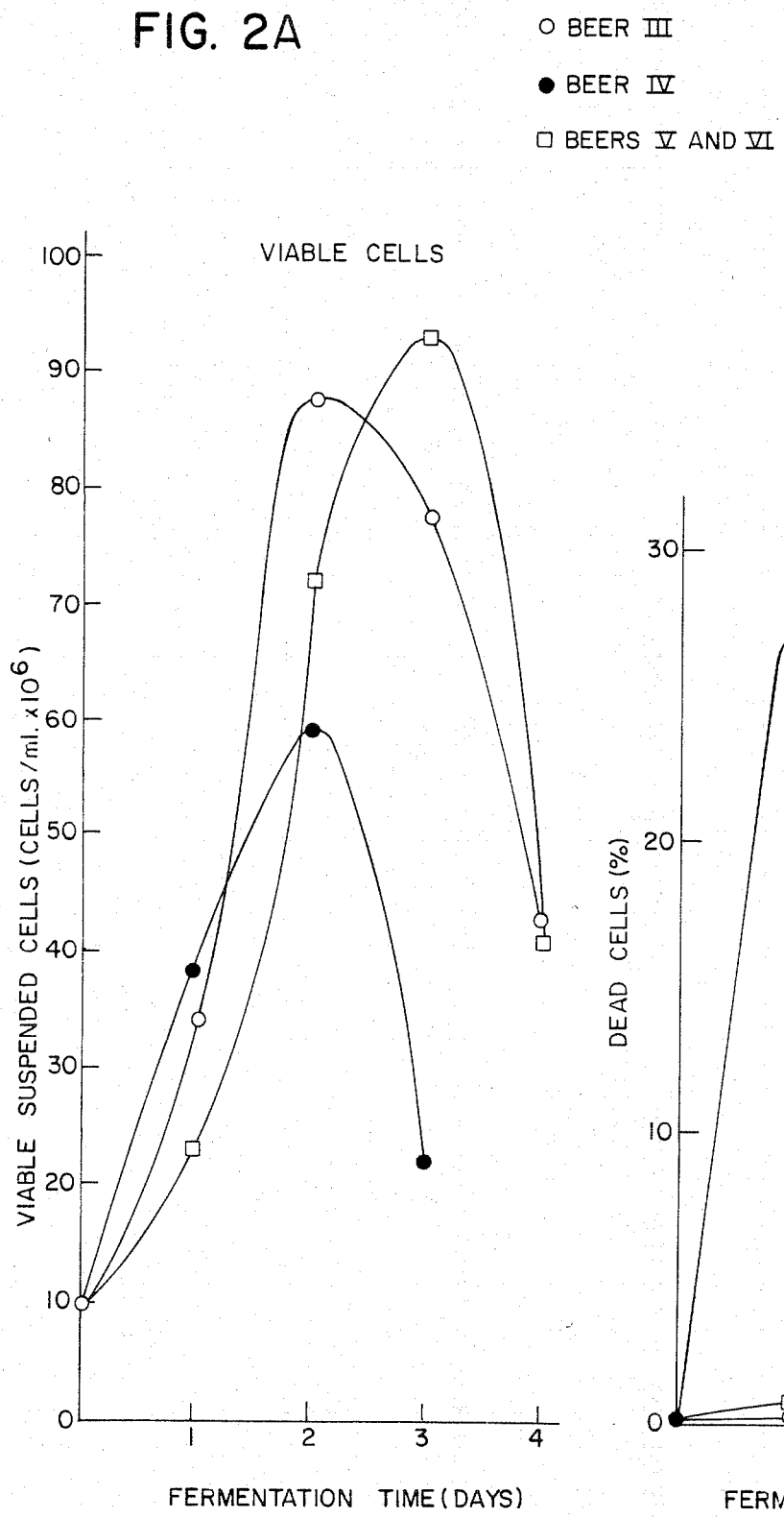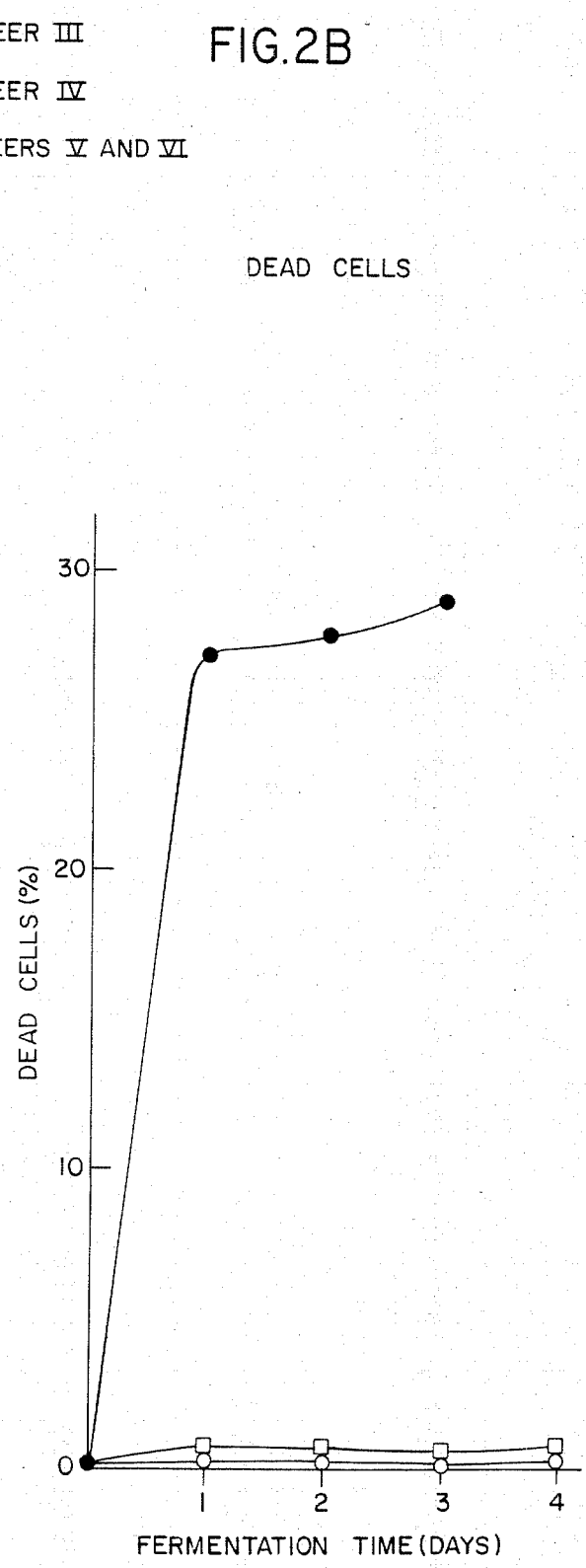
FIG. 2A
FIG. 2B
○ BEER III
● BEER IV
□ BEERS V AND VI

PREPARATION OF LOW CALORIE BEER WITH MALT EXTRACT FREE OF YEAST LETHAL FACTORS

FIELD OF THE INVENTION

The present invention relates to the preparation of malt beverages. More particularly, it relates to a method for preparation of low calorie beer and an aqueous extract containing malt enzymes for use in the method.

DESCRIPTION OF THE PRIOR ART

Recently, reduced calorie or "light" beers have gained wide acceptance in the U.S. beer market. Commercially, these beers are formulated by: (1) reducing both the alcohol and real extract concentrations in the beer to the desired calorie level or (2) hydrolyzing the limit dextrins formed during the mash cycle with various enzymes, one component of which is capable of hydrolyzing $\alpha$-1,4 linkages while the other is able to hydrolyze $\alpha$-1,6 linkages. The products of the hydrolysis are sugars which can be fermented to ethanol by yeast. The latter method is advantageous since it allows one to attain the desired calorie level with a minimum reduction of the alcohol content of the final product.

In the brewing process, the brewhouse cooking and mashing operations are performed to hydrolyze the large starch molecules obtained from malted barley and various adjunct grains into three major low molecular weight sugars (glucose, maltose, and maltotriose) which are subsequently fermented to ethanol by brewer's yeast. The limit dextrins which are polysaccharides of higher molecular weight than maltotriose are not fermentable by brewer's yeast and they remain in the beer at end of fermentation (EOF), forming the bulk of the dissolved solids or real extract of the finished beer.

Beer can be made from a variety of grains by essentially the same process. All grain starches are glucose homopolymers in which the glucose residues are linked by either $\alpha$-1,4 or $\alpha$-1,6 bonds with the former predominating. During the cooking and mashing operations, the starches are solubilized or liquified and then partially hydrolyzed to the three fermentable sugars described above. Liquefaction is the principal step effected in the cooking of grain and is catalyzed by malt $\alpha$-amylase, an endoamylase which randomly cleaves $\alpha$-1,4 bonds in the interior of the starch molecule into large but soluble dextrins. These dextrins along with those readily extracted from malt during protein rest are then saccharified into the three fermentable sugars described above. The principal saccharifying catalyst is $\beta$-amylase, a maltogenic exoamylase which sequentially cleaves $\alpha$-1,4 bonds from the non-reducing end of the dextrins. Both amylases are inactive towards the $\alpha$-1,6 linkages (branch points) of the starches (i.e. they are unable to debranch the starch molecule) and this results in the formation of the limit dextrins.

After completing the mash cycle, the spent grains are removed by passing the mash through a lauter tun to obtain the clarified lager sweet wort. The wort is then transferred to a brew kettle and boiled vigorously for 1–2 hours to inactivate the malt enzymes. It is then cooled, pitched with yeast, and fermented at temperatures ranging from 8–16° C. to convert the three fermentable sugars to ethanol. The composition of the wort can vary depending on the starting materials, mash cycle, and other variables. The carbohydrate composition of a typical wort consists of 65–80% fermentable sugars, and limit dextrins ranging from 20–35%. At end of fermentation, the fermentable fraction would have been converted to ethanol at a final concentration ranging from 3–6% w/w. The limit dextrins are not converted during fermentation and remain in the finished beer as the real extract.

In order to prepare a low calorie or "light" beer by the method involving the complete or near complete hydrolysis of the starch derived limit dextrins, it is necessary to introduce a debranching enzyme, i.e. an $\alpha$-1,6 carbohydrase somewhere in the brewing process.

In theory, the debranching enzymes may be added at any time during the brewing process. In practice, however, brewers prefer to add them during fermentation because the fermentation process itself requires 6–15 days depending on pitching rate, fermentation, temperature, etc. In contrast, the brewhouse operations are of much shorter duration (2–4 hrs/brew) and the brewhouse operates under tight scheduling constraints. Therefore, debranching enzymes are normally employed as fermentation adjuncts.

A number of enzymatic systems have been described which are capable of producing a reduced calorie or superattenuated low calorie beer. The first enzyme system used was glucoamylase as taught by Gablinger in U.S. Pat. No. 3,379,534. Glucoamylase is an extracellular enzyme produced by several fungi, but virtually all of the commercial preparations are obtained from *Aspergillus niger*. This enzyme is a nonspecific exo-amylase capable of cleaving both $\alpha$-1,4 and $\alpha$-1,6 bonds, although it is only 3–4% as active vs. the latter as the former. This enzyme produces glucose as the sole hydrolysis product of both types of glycosidic linkage. When the enzyme is used as a fermentation adjunct, the glucose produced is rapidly fermented to ethanol. Subsequently Willox, et al. (MBAA Technical Quarterly, 14, 105, 1977) succeeded in superattenuating beer using a two component enzyme system consisting of a bacterial $\alpha$-1,6 carbohydrase (pullulanase from *A. aerogenes*) and a maltogenic fungal amylase ($\alpha$-1,4 carbohydrase).

More recently beers have been superattenuated using a mixture of grain diastases, one component of which is a grain derived $\alpha$-1,6 carbohydrase and the other of which is an $\alpha$-1,4 carbohydrase.

Line et al. in U.S. Pat. No. 4,355,110 describe the use of rice pullulanase together with a variety of grain derived $\alpha$-1,4 diastases in the production of superattenuated low calorie beers. This patent teaches that both $\alpha$-1,6 and $\alpha$-1,4 activities may be obtained from rice if seed rice is first germinated.

Pratt et al. in U.S. Pat. No. 4,251,630 describe the preparation of a malt high in $\alpha$-1,6 hydrolase (i.e. pullulanase) activity and its use in the production of low calorie beer and high maltose syrup. The patent also reveals that both green and distiller's malt are sources of the enzyme. Regular brewer's malt contains little of this enzyme due to the excessive kilning temperatures employed. In the examples of the patent, the enzyme is added to the substrate stream (wort or dextrinized starch) in the form of floured whole grain.

In U.S. Pat. No. 4,272,552, Zastrow formulates a low calorie beer by adding a secondary malt mash, obtained by mashing the malt at low temperatures (50° C. or near protein rest) so that the malt $\alpha$-1,4 carbohydrases are not inactivated. The enzyme mash is added without clarification to a clarified wort from the main mash brewed using a conventional mash cycle. It is not clear from the patent if the enzyme malt secondary mash of Zastrow contains the debranching enzyme described in U.S. Pat. No. 4,251,630.

The addition of raw floured malt or slurries obtained therefrom to a fermenting beer stream, without any attempt to sterilize the grain or slurry, poses a microbiological hazard. It is well known that barley malt and cooker adjunct grains are normally heavily contaminated by various soil microorganisms. Sterility is one of the main reasons that clarified beer worts are subjected to an extensive vigorous kettle boil (1½–2 hrs.) prior to fermentation. Sterile worts insure that the resulting fermentation will be mediated solely by the pure yeast culture with which brewers inoculate the wort after it is cooled and aerated. The very sugars and other nutrients in sweet worts that support the yeast metabolism provide a good growth medium for the other microorganisms that would be introduced with unsterile raw grains or slurries of them. In addition to the potential microbiological problems, grain flours in the fermenter could make yeast reclamation more difficult at end of fermentation (EOF) since the grain would be dispersed throughout the lager yeast cream most of which would have settled out by that time.

As opposed to using the malt flour of Pratt et al. or the slurry of Zastrow, it would be better to add the malt enzymes in the form of a soluble extract which could be microbiologically stabilized and/or sterilized post extraction. This could be conveniently done by: (1) ultrafiltration, (2) evaporating off water to yield an enzyme syrup of high dissolved solids content (40–80° B), or (3) a combination of both. Another benefit of the use of the extract would be that the yeast could readily be reclaimed at EOF, since the extract would contribute virtually no solid material to the beer.

When aqueous extracts of high diastatic malts, such as green and distiller's malts, containing both $\alpha$-1,6 and $\alpha$-1,4 carbohydrases were prepared and used to superattenuate beer, however, it was unexpectedly discovered that these extracts contained one or more factors which resulted in: (1) an unacceptably high yeast mortality rate in the early stages of fermentation when the yeast should be most vigorous, (2) a depressed yeast crop throughout the fermentation, and (3) a severely damaged yeast crop at EOF which could not be used to repitch fresh beers. The consequences of the unhealthy yeast crop early in fermentation are: (1) the rate of fermentation is slowed, since the number of viable cells in suspension are reduced, and (2) the unhealthy yeast crops tend to cause severe organoleptic problems in the finished beers. Finally it is economically necessary for brewers to reclaim most of the expanded yeast crop at EOF in order to supplement the crop produced by primary propagation. Typically brewers are able to pitch 3–6 fresh fermentations with the yeast reclaimed from one fermenter.

For the foregoing reasons, it would obviously be desirable to have extracts of malts that contained both $\alpha$-1,6 and $\alpha$-1,4 carbohydrases and did not contain those factors which adversely affected the yeast.

SUMMARY OF THE INVENTION

We have discovered the presence of one or several factors in aqueous extracts of high diastatic malt, such as green malt or distiller's malt, that are lethal to brewer's yeast when these extracts are added to beer during primary fermentation. We have also discovered a method of removing those factors from the extracts so that the extracts can be used to make a superattenuated low calorie beer. The factors which are lethal to yeast have not been completely identified but, it is known that they are cations in the pH range of 5 to 8; they are heat stable at 50° C. for 30 minutes; and they have a molecular weight greater than 10,000 and probably less than 30,000. We also have discovered that they can be removed from the aqueous extracts by adsorption on silica hydrogels or weak cationic exchanger(s). For want of a better name these factors are collectively referred to hereinafter as yeast lethal factor and abbreviated YLF. When YLF is present in the extract, the fermenting beer exhibits an extremely unhealthy yeast population throughout the fermentation.

It is an object of the present invention to disclose a method of preparing enzyme preparations containing malt enzymes which are substantially free of the yeast lethal factors.

It is a further object to disclose the use of such aqueous malt enzyme preparations in a method of producing a superattenuated low calorie beer.

It is another object to disclose aqueous enzyme preparations containing malt enzymes which are substantially free of the yeast lethal factor.

These and other objects will be apparent to those skilled in the art from the description which follows.

DESCRIPTION OF THE PREFERRED EMBODIMENTS

Figure 3A:
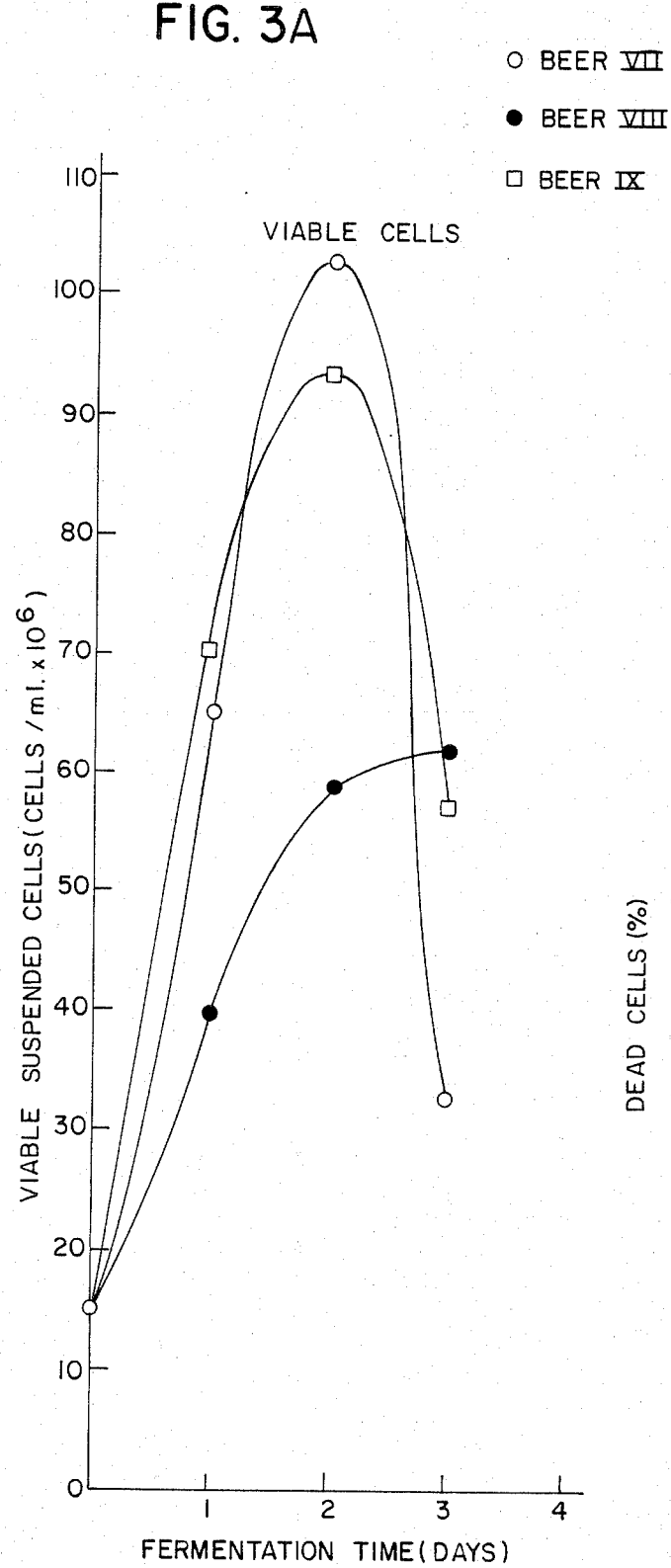

In the preferred practice of the inventive method, aqueous extracts of highly diastatic malts are prepared and the yeast lethal factors (YLF) substantially removed by treating the extracts with an adsorbent selected from a class of weak cation exchangers or silica hydrogels which adsorb the YLF but not the $\alpha$-1,6 or $\alpha$-1,4 carbohydrases. The preferred weak cation exchangers are of the carboxylic acid type and include carboxymethyl cellulose or divinylbezene crosslinked methacrylates (e.g. IRC-50 or Bio-Rex 70).

The malts used are highly diastatic malts in which the $\alpha$-1,6 and $\alpha$-1,4 carbohydrases have not been inactivated e.g. by heating. While specialty malts of the type described in the Pratt et al. U.S. Pat. No. 4,251,630 can be used, the preferred source is distiller's malt since it is commercially available from virtually all malt companies and it is a good source of $\alpha$-1,4 carbohydrases and a fair source of $\alpha$-1,6 carbohydrase or pullulanase. The aqueous extracts obtained from such malt contains a diastatic mixture of both $\alpha$-1,6 carbohydrase (pullulanase) and $\alpha$-1,4 carbohydrase ($\alpha$-and $\beta$-amylases) both of which are required to hydrolyze beer limit dextrins.

The preferred adsorbents for use in the present invention are silica hydrogels of the type described by Barby et al U.S. Pat. No. 3,617,301 which is incorporated by reference herein. The silica hydrogels may be added to the aqueous enzyme extract as an aqueous slurry or preferably as a dry powder. The YLF are adsorbed onto the silica hydrogel and the resulting filtrate contains an undiminished amount of the malt carbohydrases which have been freed of YLF.

The weak cation exchangers carboxymethylcellulose and the crosslinked methacrylates are added in the sodium form to clarified extract solutions of ionic strength $\leq 0.02$M buffer salts at a pH ranging from 5–8, preferably 6–7.

In the examples which follow, the addition rate of the diastase mixture is calculated as pullulanase units/l. Addition rates of 0.15–15 u/l wort may be employed with 2-8 u/l preferred. The examples show that when added at these levels, YLF free extracts superattenuate beer to approximately the same level as that obtained when glucoamylase or the rice-diastase systems described in the Line et al. U.S. Pat. No. 4,355,110 are used.

The following analytical procedures were used in the examples described below. Protein was determined by the Lowry method as modified by Miller (1). Pullulanase activity was determined by hydrolysis of 0.5% w/v pullulan at pH 5.0 and 50° C. Amylase activity was determined by the hydrolysis of 0.5% w/v Linter soluble starch at pH 5.0 and 50° C. The appearance of reducing sugars was monitored by the dinitrosalicylic acid method of Bernfield (2). A unit of activity in both assays was defined as the appearance of 1 mg reducing sugar (as maltose)/minute. Specific activities are expressed as units/mg protein. It was necessary to eliminate the high reducing sugar concentration prior to analysis of pullulanase levels, which were quite low. This was accomplished by diafiltering an analytical sample of the malt extract using a Model 12 Ultrafiltration cell equipped with a PM-10 membrane (M.W. cutoff =10,000 Daltons, Amicon Corp., Lexington, Mass.), prior to assay.

Alpha amylase activity was assayed vs. 0.5% w/v Linter starch at pH 5.0 and 50° C. The progress of the reaction was monitored by following the reduction in blue color of the starch iodine complex (3). A unit of $\alpha$-amylase was defined as a $\Delta A_{600}$ of 1.00/min. under these conditions.

Glucoamylase activity was determined by a modification of the method of Pazur (4), using maltose as substrate, at pH 5.0 and 25° C. The appearance of glucose was monitored using the YSI Model 27 glucose analyzer (Yellow Springs Instruments, Yellow Springs, Ohio) (3). A unit of activity was defined as the hydrolysis of 1 micromole maltose/minute under these conditions.

Fermentations were monitored by the decrease in specific gravity using the Mettler DMA-45 calculating densitometer. When no further change in specific gravity was noted the beers were considered end-fermented. The apparent degree of fermentation (ADF %) was calculated by the ASBC method (5).

Carbohydrate profiles were obtained by high-pressure liquid chromatography on Bio Rad Q 15S resin as described by the ASBC Subcommittee on brewery sugars and syrups (6) and by Scobell, et al. (7). Unless otherwise stated, all diafiltrations were performed on an Amicon DC-2 apparatus equipped with an H-1P-10 cartridge (M.W. cutoff =10,000) (Amicon Corporation, Lexington, Mass.).

The suspended yeast population was monitored early in fermentation as to number and viability by using a combination of A.S.B.C. procedures for total yeast count and dead cells (8,9). Thus aliquots of the fermenting beer were diluted ten-fold in a methylene blue solution prepared as described (8). The diluted suspension was allowed to stand at room temperature for 5 minutes after which it was layered into a hemacytometer and counted in the manner described for yeast cell concentration (9). The live and dead cells were counted for each sample.

All cells take up methylene blue. Live cells are able to reduce the dye to the colorless leukomethylene blue, whereas dead ones are unable to effect the reduction and thus remain blue after the incubation period described above.

After the beers had end-fermented, the cells at the bottom of the fermenters were resuspended by vigorous mixing of the beer. Sampling and counting were performed as described above for the cells in suspension.

The fermentations were considered unsatisfactory if the yeast crop contained more than 15% dead cells early (2-3 days after pitching) in fermentation and the yeast crop was considered unsuitable for repitching if the dead cell population was $\geq 18\%$.

The fermentations described below were performed in a typical American lager wort. The worts are pitched with a stock brewing culture of S. uvarum to a final concentration of $1 \times 10^7$ cells/ml and fermented at 15° C.

EXAMPLE 1

Extraction of $\alpha$-1,6 Carbohydrase from Distiller's Malt

Distiller's malt (Kurth Malting Co., Milwaukee, Wis.) was floured in a hammer mill (0.125" screen). The resulting flour was doughed into tap water at the rate of 330 g/l and the resultant slurry was stirred mechanically for 90' at room temperature. The bulk of the spent grain was removed by filtration through cheesecloth and the starchy filtrate was clarified by centrifugation at 10,000 rpm at 5° C. in a refrigerated centrifuge. The activity profile of this extract is shown in Table 1 (preparation #1). The $\alpha$-1,6 carbohydrase (pullulanase) yield ranged from 0.3-0.5 u/g grain. Note that the concentration of $\alpha$ and $\beta$ amylase were much higher than that of the $\alpha$-1,6 carbohydrase. In preparation 1 the $\beta$ and $\alpha$ amylase concentrations were about 5000 and 1000 fold higher than that of $\alpha$-1,6 carbohydrase.

EXAMPLE 2

Treatment of Malt Extracts With Weak Cation Exchangers to Remove Yeast Lethal Factors Extracts prepared as described in example 1 were first diafiltered vs. 6-9 volumes tap water to reduce inorganic salts and other small molecular weight compounds. Diafiltration affected a 2-4 fold purification for all the diastase with 80-100% yield. The amylolytic profile of preparation 2 (Table 1) is typical of the retentate.

The YLF were effectively removed by treatment of preparation 2 (the diafiltered extract) with either carboxymethylcellulose (CMC) or cross-linked methacrylates like Bio-Rex 70. In both cases the weak cation exchangers were added to preparation 2 in a buffer (ionic strength $\leq 0.02M$ at pH7) at the rate of 21 mg resin (moist)/mg protein and stirred for 1 hour. The resins were removed by filtration yielding the enzyme-containing preparations 3 and 4 (Table 1). These resins essentially quantitatively rejected all the pullulanase and amylases with little or no purification and retained the YLF.

EXAMPLE 3

Treatment of Malt Extracts with Silica Hydrogel to Remove Yeast Lethal Factors

A silica hydrogel (Chill-Garde, a product of the PQ Corportion) was added to a distiller's malt extract prepared as in Example 1 at the rate of 3g powder/g protein. The slurry was stirred for 1 hour at room temperature and the adsorbent was removed by filtration. The enzymatic profile of preparation 5 (Table 1) is typical of the material rejected from silica hydrogels. The YLF were retained by the silica hydrogel.

Generally the malt extracts described in the above Examples were sugar solutions of about 8°–12° Brix. In order to preserve them, they were concentrated by rotatory evaporation at 50° C. to syrups of 50°–80° Brix. This was effected with no loss of any of the amylolytic components. Where the extracts were treated with adsorbents, the concentration followed treatment.

In all the fermentations described below, the malt extracts were added to the wort at a rate of 7.5 unit pullulanase/l. In all cases these beers were compared to controls superattenuated with glucoamylase added at a rate of 9 units/l wort.

There were three series of fermentations conducted (Table II). The first demonstrates the presence of YLF in extracts of distiller's malt while the other two illustrate its removal by carboxymethylcellulose or cross-linked methacrylate and silica hydrogel. The worts in each series were pitched and aerated in bulk after which equal portions were transferred to vessels containing the enzyme solutions indicated.

EXAMPLE 4

Series A—Demonstration of Yeast Lethal Factors (YLF) in Distiller's Malt Extract Beers I and II of fermentation series A were superattenuated with glucoamylase and a distiller's malt extract prepared as described for preparation 1 (Table 1) respectively. The beer superattenuated with glucoamylase served as a control for both superattenuation limit and yeast viability.

The viable and dead yeast population for these two beers during the first four days of fermentation are illustrated in FIGS. 1A and B respectively. The dead cell count of Beer II, formulated with the malt extract, rapidly rose to about 29% the second day after pitching and remained high (24–26%) thereafter (FIG. 1B). In contrast, the dead cell count on beer I (glucoamylase control) was minimal (2–6%) through the first 3 days of fermentation. The number of dead cells in suspension then increased to about 10% as the specific gravity dropped below 1.0000 on day 4, a normal phenomenon for superattenuated beers. As a result of the high dead cell count, the peak number of viable cells in Beer II was only 60% of the number attained in Beer I (FIG. 1A) which caused the specific gravity of Beer I to decrease at a much faster rate than Beer II during the first 4–5 days of fermentation.

The condition of the yeast crop for these two beers at EOF is summarized in Table 3. The crop recovered from the control (Beer I) contains about 8% dead and is suitable for repitching. In contrast, the crop from Beer II clearly could not be repitched, since 41% of its resuspended cream was dead. The viable yield from Beer II was 66% of that from Beer I.

Surprisingly Beer II superattenuated to the same ADF as Beer I, despite the decimated condition of the yeast. This no doubt is attributable to the fact that the dextrin fraction of the wort >DP-3 was reduced at a much faster rate by the malt extract than by glucoamylase. In the absence of added carbohydrases (containing a debrancher), the ADF would be 91–92%, whereas with either GA or the malt extract, it is 106–107% (Table 2).

Finally, the morphology of the dead cells from Beer II differed markedly from those of Beer I. This could be seen in photos of the cells recovered from the beers at EOF (shot at 1000x with Nomarsky Optics). The dead cells recovered from Beer II are all severely damaged and appeared pearshaped or plasmolized. In comparison, the dead cells in Beer I appeared morphologically identical to the normal viable cells except for their inability to discharge the methylene blue stain. This striking morphological difference in dead cell appearance was noted throughout the fermentation and was most evident when the cells were actively budding.

EXAMPLE 5

Series B—Removal of YLF with Weak Cation Exchange Resins

Series B consisted of 4 beers superattenuated with the preparations noted in Table 2. Beer IV was similar to Beer I except that a diafiltered malt extract 2 was used.

The state of the yeast crop in these beers early in fermentation is illustrated in FIGS. 2A and B. As before, the dead cell count of Beer IV rose rapidly to 28% on day 2 and remained high at about 30% during the first 4 days (FIG. 2B). The majority of the dead cells appeared pearshaped or plasmolized as described above for Beer II. In contrast the control had a very low dead cell count during the first 4 days. As before, the morphology of the dead cells from Beer III was similar to the live cells and had to be differentiated by their inability to reduce the dye. The peak viable population of Beer IV was only 68% that of Beer III (FIG. 2A).

Treatment of the malt extract with the weak cation exchangers carboxymethylcellulose (CMC) or cross-linked methacrylates (Bio-Rex 70), effectively removed the yeast lethal factors (YLF). This is demonstrated in FIGS. 2A and B for Beers V and VI superattenuated with distiller's malt extracts treated with CMC or Bio-Rex 70, respectively. The dead cell count in both beers was minimal during the first 4 days of fermentation. What few dead cells there were showed a normal morphology similar to Beers I and III rather than the plasmolized appearance shown by Beers II and IV. The number of viable yeast in suspension for these beers peaked at 106% the level of control Beer III and 156% that of Beer IV. In addition, the specific gravity of these beers decreased at a faster rate than the glucoamylase control Beers I and III during the first 5 days of fermentation.

The condition of the end-of-fermentation (EOF) crop of Beers III–VI is summarized in Table 2. Again the crop from Beer IV is unsuitable for repitching since it contains about 44% dead cells and yields only 54% as many viable cells as did Beer III. In contrast the crops from Beers V and VI contain <5% dead cells and are suitable for repitching. The viable yields from Beers V and VI were 114% and 100% of Beer III, respectively.

EXAMPLE 6

Series C—Removal of YLF by Treatment with Silica Hydrogels

Figure 3B:
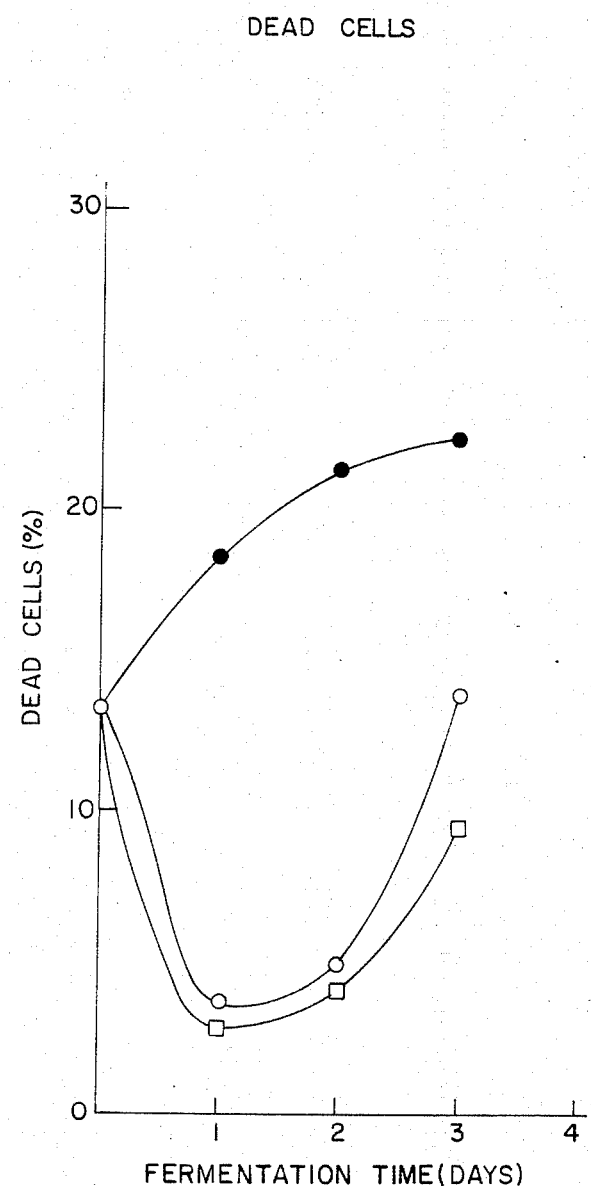

The yeast lethal factors also were removed from extracts of distiller's malt by treatment with silica hydrogels as shown by the results of series C, depicted in FIG. 3, in which Beers VII and IX were superattenuated with the enzyme systems listed in Table 2. Again the dead cell count for Beer VIII rapidly rose to 23% and remained high throughout the fermentation. The majority of the dead cells were plasmolized. The viable cell crop peaked at 65% that of the control Beer VII (FIG. 3A) and the fermentation rate of VIII lagged behind VII.

In contrast, the dead cell count of Beer IX paralleled the control, the viable cell crop peaked at 96% of Beer VII, and the rate of fermentation was greater. Moreover, the dead cells did not exhibit the plasmolized morphology characteristic of YLF.

The state of the crop at end of fermentation (EOF) is summarized for Beers VII and IX in Table 2. The dead cell counts were similar for both crops and both were suitable for repitching. The viable yeast yield from Beer IX was 87% that of Beer VII.

CONCLUSION

While the identity of the yeast lethal factors extracted from distiller's malt are not positively known at present, there is no doubt that they are present in crude aqueous extracts. It is known that: (1) the molecular weight of YLF is greater than 10,000 and less than 30,000 (fails to pass hollow fiber of 10,000 M.W. cutoff and passes fiber of 30,000 M.W. cutoff); (2) YLF is not a hull component since it also is present in dehulled grains; (3) YLF is cationic in the pH range of 5 to 8 and retained by weak cationic exchangers; (4) YLF is heat stable at 50° C. for 30 minutes, but unstable at higher temperatures; and (5) YLF is not lipid since defatting of the grain with hexane fails to remove it. The foregoing comparative tests demonstrate that YLF must be removed prior to addition to a fermenting beer since its presence results in an unhealthy yeast crop throughout the fermentation and a recovered crop that is not suitable for repitching.

TABLE I

Activity Profiles of Distiller's Malt Extracts

| Preparation # | Treatment | Pullulanase | β-Amylase | α-Amylase |
|---|---|---|---|---|
| 1 | Extract | $1.1 \times 10^{-2}$ | 48 | 11.4 |
| 2 | Diafiltered | $3.7 \times 10^{-2}$ | 167 | 25.9 |
| 3[a] | 2-Rejected from CMC | $3.8 \times 10^{-2}$ | 177 | 32.4 |
| 4[a] | 2-Rejected from Bio-Rex 70 | $4.3 \times 10^{-2}$ | 160 | 24.8 |
| 5[b] | 1-Rejected from Chill-Garde | $2.3 \times 10^{-2}$ | 74 | — |

[a]Preparations 3 and 4 were obtained by treating crude diafiltered preparation 2 with the ion exchange resins.
[b]Preparation 5 resulted from treatment of preparation 1 with a silica hydrogel.

REFERENCES

1. Miller, G. Anal. Chem. 31, 964, 1959.
2. Bernfield, F. Advances in Enzymology XII (Nord, F., ed.) 379, Interscience Publishers, New York, 1951.
3. Van Dyk, J. and Caldwell, M. Anal. Chem. 38: 318, 1956.
4. Pazur, J. Methods in Enzyomology XXVIII, Ginsberg, V. (ed.) 931, Academic Press, 1975.
5. Kneen, E. (ed.) Methods of Analysis of the American Society of Brewing Chemists: Beer 6, A.S.B.C. (publisher) 1981.
6. Martinelli, L. (Chairman) ASBC Journal 35, p. 104, 1978.
7. Scobell, H., Brobst, K. and Steele, F. Cereal Chem. 54, p. 905, 1975.
8. Kneen, E. (ed.) Methods of Analysis of the American Society of Brewing Chemists: Yeast 3- A.S.B.C. (publishers) 1981.
9. Kneen, E., ibid yeast 4.

We claim:

1. In the method of preparing a low calorie beer which comprises adding to the wort during fermentation an enzyme source containing a pullulanase to cleave the alpha-1,6 linkages of the limit dextrins in the wort to form alpha-1,4 dextrins which can be hydrolyzed to fermentable sugars by the alpha-1,4 carbohydrases which are present, the improvement which comprises employing as the enzyme source an aqueous extract of a highly diastatic malt, said extract having had yeast lethal factors removed and thereby being substantially free of yeast lethal factors.

2. A method of preparing an aqueous extract of malt containing pullulanase and α-1,4 carbohydrases, and which is substantially free of yeast lethal factors (YLF), which method comprises extracting a highly diastatic malt with an aqueous medium, separating the aqueous extract which contains the pullulanase and α-1,4 carbohydrases from the malt solids, treating the aqueous extract with an adsorbent, selected from the class of silica hydrogels and weak cation exchangers, which selectively removes the yeast lethal factors and rejects the pullulanase and carbohydrases and then isolating the aqueous extract which contains the desired pullulanase and carbohydrases and which is substantially free of the yeast lethal factors.

3. A method of preparing an aqueous extract of claim 2 in which the adsorbent is a silica hydrogel.

4. A method of preparing an aqueous extract of claim 2 in which the adsorbent is a weak cationic exchanger.

5. The method of claim 4 in which the weak cationic exchanger is carboxymethylcellulose.

6. The method of claim 4 in which the weak cationic exchanger is a crosslinked methacrylate.

TABLE 2

End of Fermentation Rate for Superattenuated Beers

| Series # | Beer # | Enzyme Preparation | Total Yeast Crop cells/ml × 10⁶ | % Dead | Viable Cells/ml × 10⁶ | time to EOF (Days) | ADF % |
|---|---|---|---|---|---|---|---|
| A | I | Glucoamylase | 99 | 7.6 | 91 | 10 | 107.0 |
|   | II | Preparation 1 | 102 | 41.0 | 60 | 10 | 106.8 |
| B | III | Glucoamylase | 93 | 1 | 93 | 8 | 106.1 |
|   | IV | Preparation 2 | 89 | 43.6 | 50 | 10 | 106.5 |
|   | V | Preparation 3 | 111 | 4.5 | 106 | 8 | 106.7 |
|   | VI | Preparation 4 | 96 | 4.2 | 92 | 7 | 106.7 |
| C | VII | Glucoamylase | 122 | 8.6 | 111 | — | — |
|   | VIII | Preparation 1 | — | — | — | — | — |
|   | IX | Preparation 5 | 111 | 13 | 97 | 7 | 106.6 |

7. An aqueous extract of malt which contains α-1,6 and α-1,4 carbohydrases, said extract having had yeast lethal factors removed and thereby being substantially free of yeast lethal factors.

8. An aqueous extract of malt suitable for use in preparing a low calorie beer, which extract contains $\alpha$-1,6 and $\alpha$-1,4 carbohydrases and is prepared by treating a crude aqueous extract of malt containing pullulanase with an adsorbent to remove the yeast lethal factors which are cationic and have a molecular weight greater than 10,000 and less than about 30,000.

* * * * *